United States Patent [19]

Linck et al.

[11] Patent Number: 4,620,926

[45] Date of Patent: Nov. 4, 1986

[54] FLOTATION APPARATUS FOR FLOTATION OF FIBROUS STOCK SUSPENSION RECOVERED FROM WASTE PAPER

[75] Inventors: Erich Linck; Herbert Holik, both of Ravensburg; Woflgang Siewert, Ravensburg-Weingartshof; Anton Selbherr, Herbertingen, all of Fed. Rep. of Germany

[73] Assignee: Sulzer-Escher Wyss GmbH, Ravensburg/Württ., Fed. Rep. of Germany

[21] Appl. No.: 685,759

[22] Filed: Dec. 24, 1984

[30] Foreign Application Priority Data

Jan. 9, 1984 [CH] Switzerland ............................ 71/84

[51] Int. Cl.[4] ............................ B03D 1/24; C02F 1/24
[52] U.S. Cl. .............................. 210/221.2; 210/928; 210/416.1; 209/170; 261/122
[58] Field of Search ...................... 210/221.2, 703, 704, 210/221.1, 928, 416.1; 261/122, DIG. 75; 209/170, 166, 164, 168; 162/4, 5

[56] References Cited

U.S. PATENT DOCUMENTS

| | | | |
|---|---|---|---|
| 1,717,223 | 6/1929 | Karlström | 210/703 |
| 3,286,844 | 11/1966 | Juell | 210/221.2 |
| 4,157,952 | 6/1979 | Krofta | 210/221.2 |
| 4,186,094 | 1/1980 | Hellberg | 261/122 |
| 4,190,522 | 2/1980 | Trä | 210/221.2 |
| 4,288,319 | 9/1981 | Heijs et al. | 210/221.2 |
| 4,347,128 | 8/1982 | Barnscheidt | 210/221.2 |
| 4,399,028 | 8/1983 | Kile et al. | 210/703 |
| 4,512,888 | 4/1985 | Flynn | 210/221.2 |
| 4,548,673 | 10/1985 | Nanda et al. | 210/221.2 |
| 4,560,475 | 12/1985 | Holik | 210/221.2 |

Primary Examiner—Benoît Castel
Attorney, Agent, or Firm—Werner W. Kleeman

[57] ABSTRACT

The flotation apparatus comprising a container having a free liquid level of the fiber stock suspension which is fed essentially horizontally to the container by at least one infeed device. The infeed device contains at least one aeration element having an outlet cross-section located at a predetermined region which is 100 to 600 mm, preferably 50 to 250 mm, below the liquid level of the fiber stock suspension in the container. Between the end of the aeration element and the discharge mouth or opening of the infeed device which opens into the container there can be arranged an essentially horizontally extending starting path for quieting or stabilizing the flow of the fiber stock suspension. This starting path is provided at its initial region with an ascending cover member at which merges a channel having a free liquid level.

18 Claims, 7 Drawing Figures

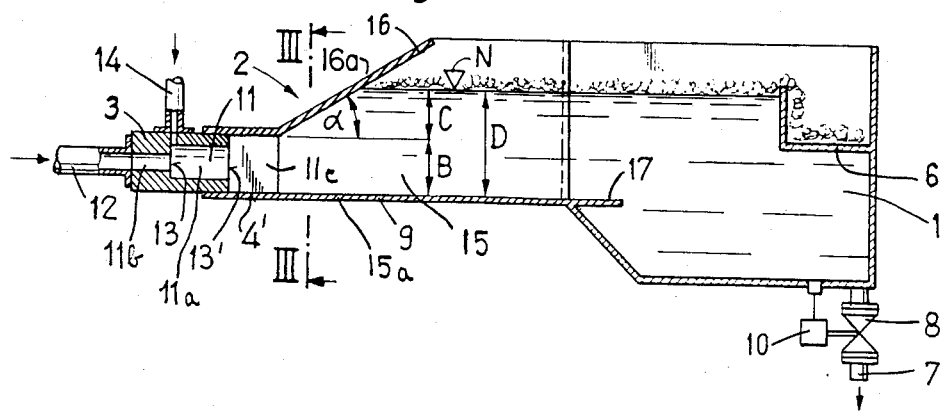
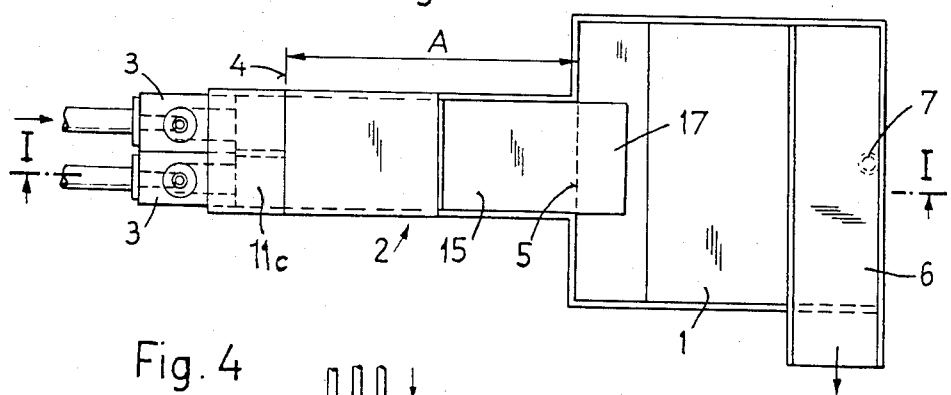
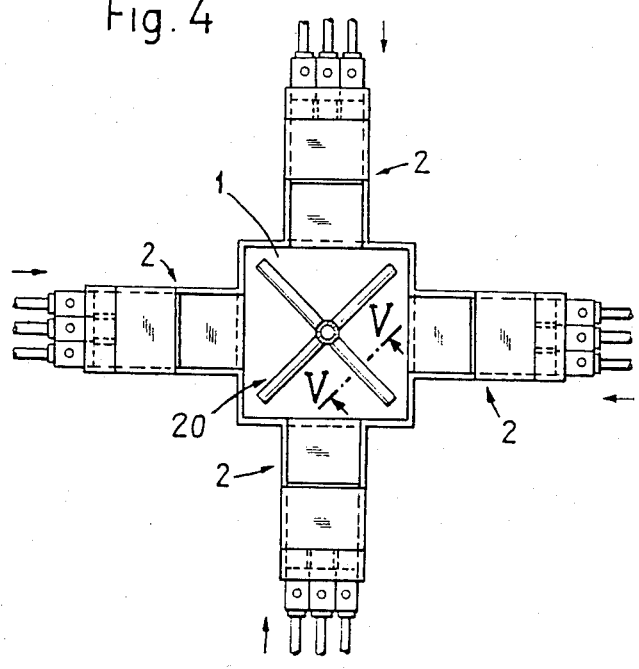
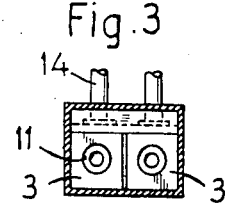
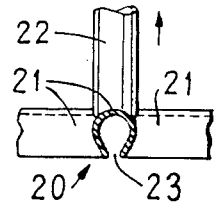

4,620,926

FLOTATION APPARATUS FOR FLOTATION OF FIBROUS STOCK SUSPENSION RECOVERED FROM WASTE PAPER

CROSS REFERENCE TO RELATED APPLICATION

This application is related to the commonly assigned, copending U.S. application Ser. No. 06/578,439, filed Feb. 9, 1984, now U.S. Pat. No. 4,560,474, and entitled "Flotation Apparatus for Floating Fiber Suspensions Extracted from Waste Paper".

BACKGROUND OF THE INVENTION

The present invention broadly relates to a flotation apparatus and, more specifically, pertains to a new and improved construction of a flotation apparatus for the flotation of fiber stock suspensions or fiber stock recovered from waste paper.

Generally speaking, the flotation apparatus of the present development is of the type comprising a container or vessel into which opens at least one infeed device for the infeed of the fiber stock suspension to be flotated. This infeed device is equipped with at least one aeration element for the aeration of the infed fiber stock suspension. Additionally, the container or vessel of the flotation apparatus is provided with an outlet for the removal of good stock and an outlet for the removal of flotation foam from the container.

Flotation equipment of this general type is afflicted with a spate of drawbacks. Thus, a first major drawback of such type flotation equipment or apparatus is the failure to realize an optimum separation of the suspension particles which are to be separated with the aid of air bubbles. At the same time there also is present a relatively high expenditure in energy for the delivery of the flotation air since such must be forced into the flotation container or vessel against the action of a relatively high static pressure of the fiber stock suspension.

SUMMARY OF THE INVENTION

Therefore, with the foregoing in mind it is a primary object of the present invention to provide a new and improved construction of a flotation apparatus which does not have associated therewith the aforementioned drawbacks and shortcomings of the prior art constructions.

Another and more specific object of the present invention aims at providing a new and improved construction of a flotation apparatus of the previously mentioned type which, in contrast to the heretofore known equipment of this type, affords an improved separation action while simultaneously reducing the energy requirements during the infeed of the flotation air.

Still a further significant object of the present invention aims at providing a new and improved construction of a flotation apparatus of the character described which is relatively simple in construction and design, extremely economical to manufacture, highly reliable in operation, has enhanced energy requirement, is not readily subject to breakdown or malfunction and requires a minimum of maintenance and servicing.

Now in order to implement these and still further objects of the invention, which will become more readily apparent as the description proceeds, the flotation apparatus of the present invention is manifested by the features that, the container or vessel exhibits a free liquid level of the fiber stock suspension, the flow of the fiber stock suspension in the infeed device extends essentially horizontally forwardly or upstream of the discharge opening or mouth of the infeed device which opens into the container or vessel, and furthermore, the outlet cross-section or cross-sectional area of the aeration element or the outlet cross-sections or cross-sectional areas of the aeration elements, as the case may be, of the infeed device is or are located in a region or range which is 0 to 500 mm, preferably 50 to 250 mm, below the liquid level of the fiber stock suspension in the container.

Due to the combination of these notable measures there is obtained an essentially horizontal flow of the fiber stock suspension at the neighborhood of the liquid level or meniscus, by means of which there is realized an optimum separation of the air bubbles charged with the particles which are to be eliminated or separated. Furthermore, the infeed of the flotation air can be accomplished with minimum energy requirements, under certain circumstances, in fact, by a self-sucking action in a diffuser-like constructed aeration element.

Preferably, there can be arranged between the end of the aeration element and the discharge opening or mouth of the infeed device opening into the container or vessel an essentially horizontally extending starting path or stretch for the quieting or calming of the flow of the fiber stock suspension. With such type of starting path it is possible, following an intensive admixing of the fiber stock suspension with air in the aeration element, for there to occur the separation of the good stock and the particles which are to be separated or eliminated. The particles which are to be separated together with the air bubbles have the tendency of ascending to the liquid level or meniscus, whereas the fiber stock suspension forming the good stock remains in the lower region of the cross-section of the starting path.

At the region of the starting path the infeed device can contain a channel having a free liquid level. The floor or base of this channel extends essentially horizontally and essentially coincides with the lower boundary of the outlet cross-section or cross-sectional area of the aeration element. In this manner there is obtained an optimum transition of the flow from the aeration element or the aeration elements, as the case may be, into the container or vessel.

The channel of the infeed device can be provided at the starting or initial region of the starting path with a cover member or cover which ascends in the flow direction of the fiber stock suspension at an angle of 20° to 70°, preferably 30° to 50°, and this cover member extends past the liquid level of the fiber stock suspension. Due to these measures there is realized an optimum transition of the aeration elements into the section of the channel having a free liquid level or meniscus, so that there can be beneficially avoided any too pronounced turbulence at the outlet of the aeration elements. Consequently, there is enhanced the separation of the fine bubbles both at the region of the starting path and in the container or vessel.

Test have found to be particularly advantageous an arrangement wherein the length of the starting path, measured from the end of the aeration element up to the discharge opening or mouth of the infeed device opening into the container or vessel, amounts to 100 to 1000 mm, preferably 200 to 600 mm.

The floor or base of the channel of the starting path can extend in the form of a sheet metal guide member or metal plating guide past the discharge opening or mouth of the infeed device leading into the container. In this way there is augmented the formation of a laminar flow in the container, and at the upper region thereof there is present the particularly intensive bubble-containing flow or stream, whereas in the lower region, below the sheet metal guide, there occurs a quieted or stabilized slow flow of the good stock suspension from which there can slowly ascend the last bubbles.

According to one particularly advantageous design of the flotation apparatus, the container or vessel can possess a substantially cylindrical configuration having a vertical cylinder axis. The infeed device opens essentially tangentially into the container. This design is particularly suitable for flotation equipment where there can be arranged a large number of infeed devices at the circumference of the container.

With this equipment design the infeed device can preferably open, in departure from the actual or strictly tangential direction, closer to the vertical lengthwise axis of the container into such container, and specifically in such a fashion that the outer boundary line of the infeed device, viewed in plan view, encloses with the circular-shape boundary line or outer contour of the container an angle of 5° to 20°. With this embodiment of the invention there are obtained improved inflow conditions for the fiber stock suspension which is delivered into the container.

According to a further design of the invention it is, however, possible for the container to have a cornered or multi-edge configuration. Either a single infeed device or also a number of infeed devices can open into such cornered-constructed container or vessel.

In the case of a plurality of infeed devices such can be directed in a substantially star-shaped or radial configuration with respect to the center of the container, or can be arranged to extend opposite to one another, for instance by being so-to-speak diametrically oppositely positioned. In this way there is obtained a counter-current flow which has been found to be particularly advantageous for the elimination or separation of the foam.

With the inventive construction of flotation apparatus the removal of the foam from the surface of the liquid level or meniscus in the container can be accomplished by an overflow device or a suction device, respectively, whereas the removal of the good stock can be accomplished downwardly opposite to the upward direction of movement of the foam in the container. Due to the such type of branching of the horizontal flow, wherein the air bubbles ascend and the good stock descends, there is obtained an optimum separation action since the flow of the air bubbles and the flow of the good stock do not mutually hinder one another.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein:

FIG. 1 is a cross-sectional view of a simple construction of flotation apparatus according to the invention, taken substantially along the line of the line I—I of FIG. 2;

FIG. 2 is a top plan view of the flotation apparatus depicted in FIG. 1;

FIG. 3 is a cross-sectional view of the flotation apparatus shown in FIG. 1, taken substantially along the line III—III;

FIG. 4 is top plan view of a modified construction of flotation apparatus of the type depicted in the arrangement of FIG. 1 but here equipped with four infeed devices;

FIG. 5 is a fragmentary sectional view of a detail of the arrangement of FIG. 4, shown on an enlarged scale and taken substantially along the line V—V in FIG. 4;

DETAILED DESCRIPTION OF THE PREFERRED EMBODIMENTS

Figure 6:
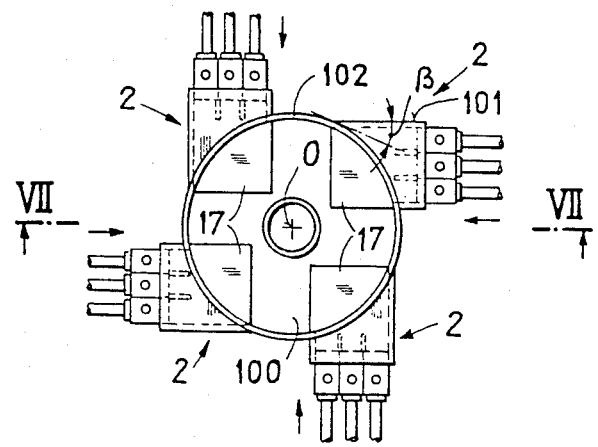
FIG. 6 illustrates an embodiment of the inventive flotation apparatus equipped with a substantially cylindrical container or vessel and four infeed devices opening essentially tangentially into the container.

Describing now the drawings, it will be understood that in order to simplify the showing of the drawings only enough of the details of the construction of the various embodiments of flotation apparatus have been conveniently depicted in the drawings so as to enable those skilled in the art to readily understand the underlying principles and concepts of the present development.

Turning attention now to the exemplary embodiment of flotation apparatus shown in FIGS. 1 to 3, there will be recognized that such flotation apparatus comprises a container or vessel 1 into which opens an infeed device 2. In the exemplary embodiment under discussion this infeed device 2 contains two aeration elements 3 as well as a starting path or initial section A which extends from the ends 4 of the aeration elements 3 up to the discharge opening or mouth 5 of the infeed device 2 which opens into the associated container or vessel 1. As will be further recognized by inspecting FIGS. 1 and 2, the container 1 additionally is equipped with an outflow trough or outflow means 6 serving as the outlet for the flotation foam as well as with a withdrawal conduit or line 7 for the removal of the good stock. A valve 8 is arranged in the good stock withdrawal or outflow conduit or line 7. This valve 8 is actuated by a suitable level regulator 10 in such a manner that the liquid level of the fiber stock suspension in the open container 1 is maintained at the height designated by the triangle or triangular arrow head N.

As will be further recognized by reverting to FIGS. 1 to 3, the aeration elements 3 each have a channel 11 which is connected in flow communication with an infeed line or conduit 12 for the infeed of the fiber stock suspension which is to be flotated. Each such channel 11 contains a step or diffuser-like enlarged portion 13, at the region of which there opens an air channel or air infeed line 14 for the infeed of the flotation air.

The starting path or section A which merges with the ends 4 of the aeration elements 3 contains a channel 15 having a free liquid level or meniscus N, at the starting region or zone 16a of which there is located a cover member or cover 16. This cover member 16 ascends in the flow direction of the fiber stock suspension at an angle α of 20° to 70°, preferably 30° to 50°, and this cover member 16 extends past the liquid level N of the fiber stock suspension, as best seen by referring to FIG. 1.

As also will be particularly well recognized from the illustration of FIG. 1, the flow of the fiber stock suspension in the infeed device 2 extends essentially horizontally forwardly or upstream of the location where the discharge opening or mouth 5 opens into the container or vessel 1. The outlet cross-section or cross-sectional areas at the ends 4 of the aeration elements 3 of the infeed device 2 are located at a region B which is located 0 to 500 mm, preferably 50 to 250 mm, beneath the liquid level N of the fiber stock suspension in the container or vessel 1.

The length of the starting path or section A, as indicated in FIG. 2, and measured from the ends 4 of the aeration elements 3 to the discharge opening or mouth 5 of the infeed device 2 opening into the container 1, can amount to 100 mm to 1000 mm, and to obtain optimum conditions preferably amounts to 200 to 600 mm. As also will be evident by inspecting FIGS. 1 and 2, the floor or base 15a of the channel 15 of the starting path or section A can extend in the form of a sheet metal guide or metal plate 17 beyond the discharge opening or mouth 5 of the infeed device 2 opening into the container 1. This channel floor 15a essentially coincides with the lower boundary of the outlet cross-section of the aeration element 3.

As will be apparent from the showing of FIG. 4 there is depicted therein a modification of the inventive flotation apparatus, which is derived from the basic construction of flotation apparatus illustrated and described with reference to FIGS. 1 to 3. This modified construction of flotation apparatus will be seen to comprise a cornered or multi-edge container or vessel 1 at which there are oriented four infeed devices 2 in a star-shaped configuration or arranged mutually opposite to one another. The arrangement and effect otherwise is the same as for the exemplary embodiment of flotation apparatus depicted in FIGS. 1 to 3. The single basic difference resides in the fact that the removal of the flotation foam is not here accomplished by an overflow or outflow trough 6 as shown in FIG. 1, but in this case by means of a suction device 20, the design of which has been illustrated in greater detail in FIG. 5. This suction device 20 contains two crosswise-arranged suction pipes or conduits 21 which are provided with slots 23 which are located at a suitable height above the liquid level N within the container or vessel 1. These suction pipes or conduits 21 are connected with a collecting conduit or pipe 22 which leads to any suitable and therefore not particularly illustrated source of negative pressure.

Figure 7:
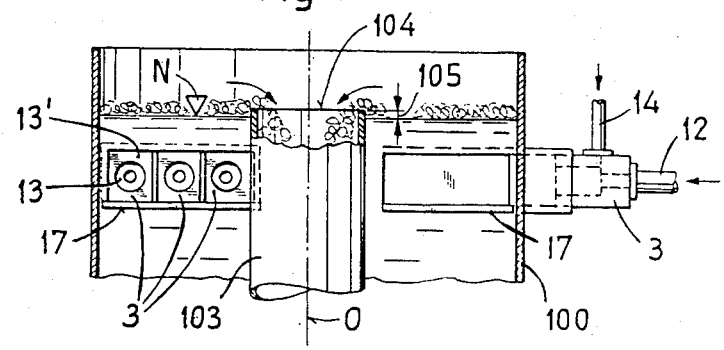
FIG. 7 is a cross-sectional view of the construction of flotation apparatus depicted in FIG. 6, taken substantially along the line VII—VII thereof.

Finally, in FIGS. 6 and 7 there is shown a further exemplary embodiment of the inventive flotation apparatus, wherein the container 100 has a vertical container axis O. Also the infeed devices 2 open essentially tangentially into such upright open container 100. Although in the arrangement of FIG. 6 there have been shown, by way of example, four infeed devices 2, it should be clearly understood that also only a single infeed device 2, or conceivably even a different number of infeed devices, can be provided. With the embodiment depicted in FIG. 6 the infeed devices 2 are arranged essentially tangentially with respect to the cylindrical shape of the container vessel 100, however are positioned to deviate somewhat from the true tangential direction and, accordingly, are positioned closer to the vertical or lengthwise axis O of the container 100. This somewhat modified tangential arrangement of the infeed devices 2 with respect to the container 100 is accomplished in such a fashion that the outer boundary line 101 of each such infeed device 2, viewed in top plan view as shown in FIG. 6, encloses with the circular-shaped boundary line or outer contour 102 of the container 100 an angle $\beta$ of 5° to 20°.

With the embodiment of FIGS. 6 and 7 the removal of the flotation foam is accomplished by a central overflow pipe or conduit 103, the upper edge 104 of which is located by a certain amount, generally indicated by reference character 105 in FIG. 7, above the liquid level N of the fiber stock suspension within the container or vessel 100.

As will be particularly evident from a renewed inspection of FIGS. 1 to 3, there has been shown therein an aeration device or element 3 which possesses a channel 11 composed of two substantially cylindrical bores 11a and 11b having different diameters as well as a rectangular end section 11c which leads to the end 4 of the related aeration device or element 3. Between the individual sections there are formed two step-shaped or diffuser-like widened portions or enlargements 13 and 13', wherein at the region of the widened or enlarged portion 13 there is accomplished the infeed or the sucking-up as the case may be, of air through the air infeed line or conduit 14. However, it should be understood that also other random constructions of air infeed devices can be beneficially employed.

In FIG. 1 the position of the upper boundary of the region B has been designated by reference character C, whereas the position of the lower boundary of the region B has been designated by reference character D.

As also will be apparent by comparing FIGS. 1 to 3 and FIGS. 6, 7, in the embodiment depicted in FIGS. 6 and 7 there is dispensed with the use of the starting path or section A of the infeed device 2.

On the other hand, with the embodiment according to FIGS. 1 to 3 the container or vessel 1 need not, as illustrated, possess an enlarged or widened form in relation to the starting path or section A. It can be formed by a simple prolongation or extension of the starting path A or, stated more precisely, its end or terminal portion.

While there are shown and described present preferred embodiments of the invention, it is to be distinctly understood that the invention is not limited thereto, but may be otherwise variously embodied and practiced within the scope of the following claims.

Accordingly, what we claim is:

1. A flotation apparatus for the flotation of fiber stock suspensions recovered from waste paper, comprising:
   a container;
   at least one infeed device for the infeed of the fiber stock suspension which is to be flotated;
   said at least one infeed device flow communicating with said container;
   at least one aeration element provided for said at least one infeed device;
   said at least one aeration element serving for the aeration of the fiber stock suspension which is intended to be delivered to said at least one infeed device and to said container;
   means defining an outlet for good stock for removal thereof from said container;
   means defining an outlet for flotation foam for removal thereof from said container;

said container, during operation of said flotation apparatus, possessing a free liquid level of the fiber stock suspension;

said at least one infeed device having a discharge mouth opening into said container;

said fiber stock suspension possessing an essentially horizontally extending flow within said at least one infeed device forwardly of said discharge mouth; and said at least one aeration element having an outlet cross-section situated at a region which is located between 0 to 500 mm below the liquid level of the fiber stock suspension in the container such that said essentially horizontally extending flow of said fiber stock suspension is infed in neighboring relationship to said free liquid level in said container.

2. The flotation apparatus as defined in claim 1, wherein:

said outlet cross-section of the at least one aeration element is located at a region situated 50 to 250 mm below the liquid level of the fiber stock suspension in the container.

3. The flotation apparatus as defined in claim 1, wherein:

said aeration element has an end;

said at least one infeed device defining an essentially horizontally extending starting path between said end of the at least one aeration device and the discharge mouth of the at least one infeed device which opens into the container; and said starting path serving for quieting of the flow of the fiber stock suspension.

4. The flotation apparatus as defined in claim 3, wherein:

said at least one infeed device contains a channel at the region of the starting path;

said channel having a free liquid level;

said channel including a channel floor which extends essentially horizontally;

said outlet cross-section of said at least one aeration element having a lower boundary; and said channel floor essentially coinciding with said lower boundary of said outlet cross-section of said at least one aeration element.

5. The flotation apparatus as defined in claim 3, wherein:

said starting path has a starting region;

a cover member provided for said channel of said at least one infeed device at the starting region of the starting path; and said cover member ascending in the direction of flow of the fiber stock suspension at an angle in the range of approximately 20° to 70° and protruding past the liquid level of the fiber stock suspension.

6. The flotation apparatus as defined in claim 5, wherein:

said ascending angle of said cover member amounts to 30° to 50°.

7. The flotation apparatus as defined in claim 3, wherein:

the length of the starting path measured from the end of the at least one aeration element up to the discharge mouth of the at least one infeed device which opens into said container amounts to approximately 100 to 1000 mm.

8. The flotation apparatus as defined in claim 7, wherein:

said length amounts to 200 to 600 mm.

9. The flotation apparatus as defined in claim 3, wherein:

said floor of said channel of said starting path comprises a sheet metal guide which extends beyond the discharge mouth of the at least one infeed device into the container.

10. The flotation apparatus as defined in claim 3, wherein:

said container is formed by an extension of said starting path.

11. The flotation apparatus as defined in claim 1, wherein:

said container possesses a substantially cylindrical configuration having a substantially vertical cylinder axis; and said at least one infeed device opening essentially tangentially into said container.

12. The flotation apparatus as defined in claim 11, wherein:

a plurality of said infeed devices are distributively arranged at the circumference of the container.

13. The flotation apparatus as defined in claim 12, wherein:

said at least one infeed device has an outer boundary line;

said container having a substantially circular-shaped boundary line; and said at least one infeed device opening at a deviation from an exact tangential direction closer to the vertical cylinder axis such that said outer boundary line of said at least one infeed device, viewed in plan view, encloses an angle of approximately 5° to 20° with the circular-shaped boundary line of the container.

14. The flotation apparatus as defined in claim 11, wherein:

said at least one infeed device has an outer boundary line;

said container having a substantially circular-shaped boundary line; and said at least one infeed device opening at a deviation from an exact tangential direction closer to the vertical cylinder axis such that said outer boundary line of said at least one infeed device, viewed in plan view, encloses an angle of approximately 5° to 20° with the circular-shaped boundary line of the container.

15. The flotation apparatus as defined in claim 1, wherein:

said container defines a structure having a plurality of corners.

16. The flotation apparatus as defined in claim 15, wherein:

said container has a center; and a plurality of said infeed devices are directed in a substantially star-shaped configuration towards the center of the container.

17. The flotation apparatus as defined in claim 1, wherein:

said flotation foam outlet means comprises an overflow means for the removal of the foam from the surface of the liquid level; and said means for the removal of the good stock withdraws the good stock downwardly opposite to the direction of movement of the foam in the container.

18. The flotation apparatus as defined in claim 17, wherein:

said overflow means comprises a suction device.

* * * * *